United States Patent [19]

Meyer et al.

[11] Patent Number: 4,628,069

[45] Date of Patent: Dec. 9, 1986

[54] POLYAMIDES CONTAINING PHENOLIC COMPOUNDS

[75] Inventors: Rolf-Volker Meyer; Friedrich Fahnler; Rolf Dhein; Dietrich Michael, all of Krefeld, Fed. Rep. of Germany

[73] Assignee: Bayer Aktiengesellschaft, Leverkusen, Fed. Rep. of Germany

[21] Appl. No.: 737,103

[22] Filed: May 23, 1985

Related U.S. Application Data

[63] Continuation-in-part of Ser. No. 561,301, Dec. 14, 1983, abandoned.

[30] Foreign Application Priority Data

Dec. 28, 1982 [DE] Fed. Rep. of Germany ....... 3248329

[51] Int. Cl.$^4$ ............................................. C08K 5/13
[52] U.S. Cl. .................................... 524/339; 524/171; 524/340; 524/349; 524/351; 524/352
[58] Field of Search ............... 524/606, 326, 339, 349, 524/351, 352, 353, 171; 8/613

[56] References Cited

U.S. PATENT DOCUMENTS

| | | | |
|---|---|---|---|
| 1,778,548 | 10/1930 | Calcott et al. | 524/339 |
| 1,830,749 | 11/1931 | Calcott et al. | 524/352 |
| 1,989,788 | 2/1935 | Calcott et al. | 524/352 |
| 2,491,934 | 12/1949 | Schlattman | 524/171 |
| 2,965,599 | 12/1960 | Gabler | 524/353 |
| 3,182,100 | 5/1965 | Bedell | 524/352 |
| 3,428,691 | 2/1969 | Spacht | 524/339 |
| 3,624,245 | 11/1971 | Crovatt | 524/291 |
| 3,640,761 | 2/1972 | Hamanaka et al. | 524/352 |
| 3,970,634 | 7/1976 | Horn et al. | 524/606 |

FOREIGN PATENT DOCUMENTS

932066  7/1963  United Kingdom .

OTHER PUBLICATIONS

George Scott: *Atmospheric Oxidation and Antioxidants* (1968), pp. 330–339.

*Primary Examiner*—Veronica P. Hoke
*Attorney, Agent, or Firm*—Connolly and Hutz

[57] ABSTRACT

Thermoplastic polyamides containing phenolic compounds in quantities of from 0.5 to 15%, by weight, based on polyamide are less sensitive to water.

5 Claims, No Drawings

POLYAMIDES CONTAINING PHENOLIC COMPOUNDS

This is a continuation-in-part application of the application Ser. No. 561,301, filed Dec. 14, 1983, now abandoned.

This invention relates to thermoplastic polyamides containing phenolic compounds.

The range of outstanding properties for which thermoplastic polyamides are well known depends to a large extent upon the hydrogen bridges between various carbonamide groups. They are also influenced by the hydrophilicity of the polarity of the carbonamide groups which are responsible for an uptake of water both on storage in water and also in a normal atmosphere (cf. for example Kunststoffhandbuch, Vol. VI, Polyamide, Carl-Hanser-Verlag, Munich, 1966, pages 458 et seq.).

Thus, for example, the impact strength of polyamide mouldings depends to a considerable extent upon the water content of the mouldings. When articles are free from water, for example after production by injection moulding, polyamide mouldings, particularly those produced from freeflowing and, hence, readily-processible polyamides of medium molecular weight, are relatively sensitive to impact. This applies in particular to mouldings of partially crystalline polyamides.

Although conditioning with water considerably improves the toughness of these mouldings, it also impairs certain properties like the rigidity as measured by the E-modulus.

However, high rigidity and adequate toughness of the mouldings are necessary for many applications, particularly for functional and bodywork parts of cars.

Since the amount of water taken up by polyamides also depends upon their crystallinity, it may be influenced to a moderate extent by crystallisation-promoting additives and by suitable treatment after polymerisation and moulding (for example tempering).

However, a major change in the amount of water being taken up by partially crystalline polyamides, such as PA-6,6 cannot be achieved in this way.

There are several known processes for improving the toughness of polyamides, even immediately after injection moulding and without watering. For example, it is possible to blend the polyamide with certain elastomeric polymers. Thus, polyethylenes, copolymers of ethylene with polar comonomers, such as vinyl acetate, (meth) acrylic acid(esters) are suitable modifying components. Rubbers, such as copolymers of butadiene and acrylonitrile, have also been proposed as toughness-improving additives.

In all these cases, an improvement in the toughness of the polyamide is obtained. However, since the tendency of the polyamide to take up water still remains the inevitable uptake of water causes a further deterioration in rigidity, usually already reduced by the polymeric toughness modifiers, in most cases to such an extent that the products are totally unsuitable for industrial application.

Although polyamides of long-chain amid-forming components, i.e. products having lower concentrations of CONH-groups in the polymer chains, take up distinctly less water and thus their mechanical properties are less affected, these products show inadequate dimensional stability to heat and rigidity for many applications and, in addition, are expensive on account of the high price of the starting materials.

Accordingly, there is a need for polyamides having high dimensional stability to heat, high rigidity, satisfactory toughness and improved dimensional stability in relation to PA-6 and PA-6,6.

It has now surprisingly been found that the amount of water being taken up by a polyamide, preferably a partially crystalline polyamide, may be reduced and a polyamide having the required combination of properties may be obtained providing the polyamide is modified with certain phenolic compounds having a relatively high molecular weight.

The use of several sterically hindered, preferably o,o'-disubstituted phenolic compounds as heat stabilisers for polyamides has been repeatedly proposed. In general, these compounds are sufficiently active in quantities of as low as 0.5%, by weight.

In the DOS No. 1,769,662 the use of up to 40% of certain phenols, preferably polyphenols, for improving the elasticity of polyamide fibres is recommended. There is no reference to an improvement of the dimensional stability of polyamides.

Accordingly the present invention relates to thermoplastic polyamide moulding compositions which comprise from 3 to 15%, by weight, preferably 4 to 8%, by weight, based on the polyamide, of at least one relatively high molecular weight or long-chain monophenolic compound with $C_{10}$–$C_{22}$ being substituted in at most one o-position to the phenolic OH-group and therefore always a sterically unhindered phenolic compound, which is selected from the group of mono- or poly- $C_1$–$C_{12}$, preferably $C_4$–$C_{12}$ alkyl- and/or $C_7$–$C_{15}$ aralkyl-substituted monophenols or hydroxy diphenyls or triphenyls optionally substituted by at least one $C_1$–$C_6$ alkyl group, the rings of which may optionally be attached via —O—, $C_1$–$C_3$ alkylene or —$SO_2$— bridge members.

The following phenolic compounds are mentioned as examples: tetrahydronaphthol, 2-butylphenol (sec. and t), 4-t-butylphenol, thymol, 4-t-pentylphenol, octylphenol (mixtures), nonylphenol (mixtures), dodecylphenol (mixtures), 4-hydroxydiphenyl, 2-hydroxydiphenyl, alkyl substituted hydroxy diphenyls of the type described, for example, in DOS No. 1,943,230, 1-naphthol, 2-naphthol, benzylphenol(s), benzylcresol(s), 2-phenyl-2-(4-hydroxyphenyl)-propane, 4-hydroxydiphenylsulphone, 4-hydroxydiphenyl ether, 2- or 4-cyclohexylphenols or mixtures of these compounds.

It is particularly preferred to use nonylphenol, dodecylphenol, 2-hydroxybiphenyl, and 2-phenyl-2-(4-hydroxyphenyl)-propane. The phenolic component is incorporated in quantities of from 3 to 15% by weight, preferably from 4 to 8%, by weight, based on the polyamide.

The polyamides used may be linear polycondensates of lactams containing at least 5 ring members, such as ε-caprolactam or lauric lactam, or of corresponding ω-aminocarboxylic acids; or of diamines and dicarboxylic acids, such as 6,6-, 6,7-, 6,8-, 6,9-, 6,10-, 6,12-, 8,8-, 12,12-polyamide, or polycondensates of aromatic dicarboxylic acids, such as isophthalic acid or terephthalic acid, with diamines, such as hexamethylene diamines or octamethylene diamine, or araliphatic diamines, such as m- or p-xylylene diamines, and adipic acid, suberic acid, sebacic acid, polycondensates based on alicyclic monomers such as cyclohexane dicarboxylic acid, cyclohexane diacetic acid, diaminodicyclohexylmethanes or isophorone diamine.

Partially crystalline polyamides are preferably used. PA-6 and PA-6,6 being particularly preferred.

Instead of using polyamides, it is also possible to use polymer blends of predominantly (preferably at least 60%, by weight) polyamide and known elastifying polymers, such as polyolefins, olefinic copolymers, preferably those containing polar groups, and also corresponding graft (co)polymers.

To produce the modified polyamides according to the present invention, the polyamide component and the modifiers may be mixed above the melting point of the polyamide. This may be done, for example, immediately after production of the polyamide by mixing the modifier with the melt spun in strand form. The polyamides modified in accordance with the present invention are preferably produced by mixing the components in conventional screw extruders.

This process is particularly appropriate in cases where, in addition to polyamides, other polymers are used for producing modified polymeric blends or in cases where other additives, such as stabilisers, mould release agents, lubricants, crystallisation accelerators, plasticisers, pigments, dyes, reinforcing materials and/or fillers, such as glass fibres or asbestos, are incorporated.

Known types of apparatus are suitable for compounding. Twin screw extruders are preferably used.

The polyamide moulding compositions according to the present invention are distinguished from unmodified polyamides by considerably improved dimensional stability and greater rigidity for otherwise substantially the same property spectrum. The polyamide moulding compositions are particularly suitable for the production of glass fibre-reinforced or filled mouldings because the improvement of the rigidity and obtained by the addition of the reinforcing material preferably added in quantities of from 10 to 60%, by weight, is far less impaired than hitherto by the uptake of water.

These glass fibre-reinforced products are distinguished by improved elongation at break and toughness.

The present polyamide moulding compositions are particularly suitable for the production of mouldings by injection moulding and may be used with advantage for applications requiring a combination of high rigidity, high dimensional stability to heat and satisfactory toughness. The glass fibre-reinforced products may be used with advantage for mouldings in the automotive industry, such as radiator boxes or oil sumps.

EXAMPLE 1

95%, by weight, of a 6-polyamide having a relative viscosity of 2.9, as measured using a 1% solution in m-cresol at 25° C., and 5%, by weight, of p-nonylphenol (isomer mixture) are separately delivered by means of a weighing machine or a metering pump to a "ZSK 53" twin-screw extruder and extruded 260° C./90 r.p.m. The homogeneous melt is spun in the form of a strand into a water bath, granulated and dried at from 80° to 100° C. to a water content of <0.1%. The product has a relative viscosity of 2.8.

Mouldings produced from the product and unmodified comparison specimens are stored for prolonged periods in a normal atmosphere and in water. Under various conditions, the polyamides modifed in accordance with the present invention take up distinctly less water. The measured data obtained are shown in Table 1.

EXAMPLES 2 to 5

Following the procedure of Example 1, various hydrophobising additives are incorporated into various polyamides and the products obtained tested in the same way as described in Example 1. The composition of the modified polyamides and the properties thereof are shown in Table 1.

EXAMPLES 6 to 8

Glass fibre-reinforced polyamides are produced in the same way as in Example 1 and the products obtained are processed into mouldings. The composition of the modified glass fibre-reinforced polyamides and the properties thereof are shown in Table 2.

EXAMPLE 9

A glass fibre-reinforced, elastomer-modified PA-6, which, immediately after injection moulding, has a breaking elongation of 10.9%, is produced as in Example 1 from 60 parts, by weight, of a polyamide-6 having a relative viscosity of 2.9, 24% of glass fibres, 11% of a polybutadiene rubber grafted with methylmethacrylate and 5% of o-phenylphenol.

COMPARISON EXAMPLE 1

A product produced as in Example 9 from 65 parts of PA-6, 24% of glass fibres and 11% of the same polybutadiene rubber grafted with methylmethacrylate, but without any hydrophobising additives, has a breaking elongation of only 5.4%.

TABLE 1

| | Starting components | | | Product properties | | |
| --- | --- | --- | --- | --- | --- | --- |
| | | | | | Water uptake [%, by weight] | |
| | PA ($\eta$rel)* | Quantity (% by weight) | Additive (% by weight) | $\eta$rel* | after 66 days in a normal climate | after 40 days storage in water (23° C.) |
| Example 1 | PA-6 (2.9) | 95 | p-nonylphenol (5) | 2.8 | 0.78 | 3.40 |
| Example 2 | PA-6 (2.9) | 95 | o-phenylphenol (5) | 2.8 | 0.74 | 3.14 |
| Example 3 | PA-6 (2.9) | 99 | o-phenylphenol (1) | 2.9 | 0.94 | 4.41 |
| Example 4 | PA-6 (2.9) | 95 | p-cumylphenol (5) | 2.8 | 0.80 | 3.76 |
| Example 5 | PA-6,6 (2.7) | 95 | o-phenylphenol (5) | 2.6 | 0.53 | 1.85 |
| Comparison 1 | PA-6 | 100 | — | 2.9 | 1.06 | 5.10 |

TABLE 1-continued

| | Starting components | | | Product properties Water uptake [%, by weight] | |
|---|---|---|---|---|---|
| | PA ($\eta$rel)* | Quantity (% by weight) | Additive (% by weight) | after 66 days in a normal climate $\eta$rel* | after 40 days storage in water (23° C.) |
| Comparison 2 | PA-6,6 | 100 | — | 2.7  0.70 | 2.80 |

*$\eta$rel = relative viscosity measured on a 1% solution in m-cresol at 25° C.

TABLE 2

| | Starting components | | | | Normal atmosphere Product properties Water uptake (% by weight) | |
|---|---|---|---|---|---|---|
| | PA type ($\eta$rel)* | Quantity (% by weight) | Glass fibres [% by weight] | Additive (%, by weight) | after 66 days in a normal atmosphere | after storage in water for 24 hours/60° C. |
| Example 6 | PA-6 (2.9) | 65 | 30 | o-phenylphenol (5) | 0.36 | 2.0 |
| CE 3 | PA-6 (2.9) | 70 | 30 | — | 0.56 | 3.2 |
| Example 7 | PA-6,6 (2.8) | 65 | 30 | o-phenylphenol (5) | 0.35 | 1.1 |
| CE 4 | PA-6,6 (2.8) | 70 | 30 | — | 0.48 | 1.6 |
| Example 8 | PA-6,6 (2.8) | 65 | 30 | p-cumylphenol (5) | 0.28 | 1.2 |

We claim:

1. A themoplastic polyamide molding composition consisting essentially of (i) one polyamide and (ii) from 3 to 15% by weight, based on polyamide, an unsubstituted or substituted $C_{10}$-$C_{22}$ sterically unhindered monophenolic compound, which when substituted is substituted in at most of one o-position by one or more $C_1$-$C_{12}$ alkyl or $C_7$-$C_{15}$ aralkyl groups, or hydroxy diphenyls or hydroxy triphenyls optionally substituted by one or more $C_1$-$C_6$ alkyl group, the rings of which may optionally be attached through —O— or $C_1$-$C_3$ alkylene.

2. Polyamides as claimed in claim 1, wherein as phenolic compound a member of the group tetrahydronaphthol, 2-butylphenol (sec. and t), 4-t-butylphenol, thymol, 4-t-pentylphenol, octylphenol (mixtures), nonylphenol (mixtures), dodecylphenol (mixtures), 4-hydroxydiphenyl, 2-hydroxydiphenyl, an alkyl substituted hydroxy diphenyl, 1-naphthol, 2-naphthol, benzylphenol(s), benzylcresol(s), 2-phenyl-2-(4-hydroxyphenyl)-propane, 4-hydroxydiphenyl ether, 2- or 4-cyclohexylphenol and a mixture of these compounds is used.

3. Polyamides as claimed in claim 1 wherein as phenolic compound a nonylphenol, a dodecylphenol, 2-hydroxybiphenyl or 2-phenyl-2-(4-hydroxyphenyl)-propane is used.

4. Polyamides as claimed in claim 1, wherein as polyamide polyamide-6 or polyamide-6,6 is used.

5. Polyamides as claimed in claim 1, containing 10 to 60% by weight, based on the moulding composition of reinforcing material.

* * * * *